(12) United States Patent
Delwasse et al.

(10) Patent No.: US 11,552,908 B2
(45) Date of Patent: Jan. 10, 2023

(54) METHOD AND SYSTEM FOR RELIABLE AND DETERMINISTIC DATA TRANSMISSION

(71) Applicant: SILKAN RT, Paris (FR)

(72) Inventors: Serge Delwasse, Paris (FR); Vincent Laporte, Paris (FR)

(73) Assignee: CETRAC TECHNOLOGIES, Paris (FR)

( * ) Notice: Subject to any disclaimer, the term of this patent is extended or adjusted under 35 U.S.C. 154(b) by 0 days.

(21) Appl. No.: 17/289,347

(22) PCT Filed: Oct. 29, 2019

(86) PCT No.: PCT/FR2019/052569
§ 371 (c)(1),
(2) Date: Apr. 28, 2021

(87) PCT Pub. No.: WO2020/089558
PCT Pub. Date: May 7, 2020

(65) Prior Publication Data
US 2021/0352025 A1      Nov. 11, 2021

(30) Foreign Application Priority Data

Oct. 31, 2018   (FR) ...................................... 1860078

(51) Int. Cl.
*H04L 12/861*       (2013.01)
*H04L 49/90*        (2022.01)
(Continued)

(52) U.S. Cl.
CPC .......... *H04L 49/9094* (2013.01); *H04L 49/15* (2013.01); *H04L 49/60* (2013.01); *H04L 2212/00* (2013.01)

(58) Field of Classification Search
CPC ..... H04L 49/9094; H04L 49/15; H04L 49/60; H04L 2212/00; H04L 49/90; H04L 49/9063
See application file for complete search history.

(56) References Cited

U.S. PATENT DOCUMENTS 5,841,771 A * 11/1998 Irwin ................. H04Q 11/0478
                                                      370/383
2002/0091844 A1* 7/2002 Craft ..................... H04L 69/162
                                                      719/321
(Continued)

FOREIGN PATENT DOCUMENTS

JP       2002 149504       5/2002

*Primary Examiner* — Mewale A Ambaye
(74) *Attorney, Agent, or Firm* — Duane Morris LLP; Gregory M. Lefkowitz; Joaquin Hernandez

(57) ABSTRACT

The present invention relates to a data transmission system including a data exchange unit; wherein, to transmit a data frame, it passes successively at least through an interface module that is configured to receive said data frame from outside the transmission system; an analysis and filtering module responsible for processing said data frame which is received from the interface module before encapsulation; and an encapsulation module responsible for encapsulating said data frame processed by the analysis and filtering module, wherein two successive modules through which said data frame passes are connected to one another by an interconnection device each including a temporary memory for storing said frame and the read and write accesses to said memory being frequency-independent.

20 Claims, 7 Drawing Sheets

(51) Int. Cl.
*H04L 49/15* (2022.01)
*H04L 49/60* (2022.01)

(56) References Cited

U.S. PATENT DOCUMENTS

| | | | |
|---|---|---|---|
| 2006/0075119 A1* | 4/2006 | Hussain | H04L 49/90 709/227 |
| 2008/0165795 A1* | 7/2008 | Baruch | H04L 49/90 370/421 |
| 2012/0020250 A1* | 1/2012 | Sundararaman | H04L 47/621 370/256 |
| 2014/0359044 A1* | 12/2014 | Davis | H04L 45/74591 709/213 |
| 2020/0028800 A1* | 1/2020 | Strathman | G06F 3/0689 |
| 2021/0160318 A1* | 5/2021 | Sajeepa | G06F 3/0688 |

\* cited by examiner

|   | 1 | 2 | 3 | 4 |
|---|---|---|---|---|
| Reg1 | MAC DEST | MAC DEST | MAC DEST | MAC DEST |
| Reg2 | MAC DEST | MAC DEST | MAC SRC | MAC SRC |
| Reg3 | MAC SRC | MAC SRC | MAC SRC | MAC SRC |
| Reg4 | ETH TYP | ETH TYP | | |

METHOD AND SYSTEM FOR RELIABLE AND DETERMINISTIC DATA TRANSMISSION

CROSS-REFERENCE TO RELATED APPLICATIONS

This application is a § 371 national stage entry of International Application No. PCT/FR2019/052569, filed Oct. 29, 2019, which claims priority to French Patent Application No. 1860078 filed Oct. 31, 2018, the entire contents of which are incorporated herein by reference.

FIELD OF THE INVENTION

The present invention concerns the field of telecommunications.

More particularly, the present invention concerns the data transport in a reliable and deterministic manner.

TECHNOLOGICAL BACKGROUND

In a telecommunications network, the data transport takes place in usual manner in the form of data frames which are established according to a predefined protocol. In order to transport a frame between a data emitter (or producer) and a receiver (or consumer), a switch which is made from processing units controlled by software is usually used. A conventional example of a network switch is the Ethernet switch.

This type of switch does not allow safely guaranteeing the effective delivery of the data frame or a maximum delay of transmission of this frame. The use of such switches in the systems called "critical" systems where the total reliability of the transmissions is required is therefore not possible. Furthermore, this type of switch is generally limited to use according to a single physical and logical communication protocol.

Thus, there is a need for a data communication system allowing the data communication with integrity and within a guaranteed maximum delay, without limitation of use of a particular protocol.

The present invention falls within this context.

SUMMARY OF THE INVENTION

According to one aspect of the invention, there is provided a data transmission system comprising a data exchange unit; in which, in order to transmit a data frame, said data frame passes successively at least through:
  an interface module configured to receive said data frame from the outside of the transmission system;
  an analysis and filtering module in charge of processing said data frame received from the interface module before encapsulation; and
  an encapsulation module in charge of encapsulating said data frame processed by the analysis and filtering module; characterised in that, two successive modules through which said data frame passes are connected to each other by an interconnection device each comprising a temporary memory for storing said frame and the write and read accesses to said memory being independent in frequency.

A data transmission system according to the first aspect allows guaranteeing the independence of an upstream module and a downstream module through which a data frame passes. Indeed, the presence of an interconnection device according to claim 1, between two modules, allows isolating the data processing chains of each module from each other. The interconnection device is used as a storage barrier in the data flow.

The interconnection device according to the invention allows each module to have its own operating clock. The performances are thus increased because each module can carry out the processing which is specific thereto without having to take into account what may happen in the module which follows or precedes it.

In a system according to the first aspect, each module can thus be designed independently. Furthermore, updating a system according to the first aspect is simplified because it is possible to modify one module without affecting the rest of the system.

Finally, the use of an interconnection device between two modules allows not to modify the determinism of the entire transmission system. The level of safety is therefore preserved.

For example, the interconnection device can ensure a management called "FIFO" ("First In, First Out") management of the data exchanged therethrough.

The interconnection device according to the invention also allows presenting at output only valid data thanks to the filtering of the abnormal data.

In one embodiment, the data transmission system further comprises a database unit configured to store the data frames which are encapsulated by the encapsulation module; it is connected to the encapsulation module by an interconnection device comprising a temporary memory for storing said frame and the write and read accesses to said memory being independent in frequency.

In one embodiment, in order to transmit a data frame, the latter further passes successively at least through:
  a module for generating the data to be emitted in charge of receiving encapsulated data frames from the database unit and of processing them with a view to a retransmission; and
  an emission checking module in charge of de-encapsulating an encapsulated data frame which is received from the module for generating the data to be emitted then transmitting the de-encapsulated data frame to the interface module with a view to emitting the de-encapsulated data frame out of the transmission system.

In one embodiment, the database unit is connected to the module for generating the data to be emitted by an interconnection device comprising a temporary memory for storing said frame and the write and read accesses to said memory being independent in frequency.

In one embodiment, the data exchange unit also comprises:
  a management module in charge of managing the emissions of encapsulated data frames from the database unit; and
  a command generation module in charge of generating commands for the database unit to control the extraction of a data item to be retransmitted and communicate it to the module for generating the data to be emitted.

In one embodiment, the database unit connected to the management module by an interconnection device comprising a temporary memory for storing control and signaling data and the write and read accesses to said memory being independent in frequency. In one embodiment, the database unit is connected to the command generation module by an interconnection device comprising a temporary memory for storing control and signaling data and the write and read accesses to said memory being independent in frequency.

In one embodiment, which the data exchange unit further comprises a status management module, in charge of storing the current operating states of each of the modules of the data transmission system, connected to the interface module by an interconnection device comprising a temporary memory for storing control and signaling data and the write and read accesses to said memory being independent in frequency.

In one embodiment, two successive modules through which said data frame passes operate according to independent clocks. In one embodiment, the memory of each interconnection device is parametrisable at initialisation.

In one embodiment, each interconnection device comprises a write interface to store data in the temporary memory as they are received and a read interface to read said data in the order they are received. In one embodiment, each interconnection device, in which a data frame passes, is configured to store the data frames as they are received and to read said data frames in the order they are received.

In one embodiment, the read and write interfaces have an asynchronous clock relationship. In one embodiment, the write interface is configured to carry out a processing on at least one data item stored in said temporary memory to detect errors and interrupt the data storage if an error is detected. In one embodiment, the read interface is configured to read the entire data, to re-read the data or to delete the data. In one embodiment, the read interface is configured to carry out a processing on at least one data item stored in said temporary memory in order to extract information on said at least one data item. In one embodiment, each interconnection device comprises an error reporting interface for transmitting the write or read operating errors.

In one embodiment, each module is made in an application-specific programmable circuit or integrated circuit module. In one embodiment, each interconnection device is made in an application-specific programmable circuit or integrated circuit.

In one embodiment, the analysis and filtering module comprises:
- a unit for receiving a data frame to be retransmitted,
- a memory unit for storing said data of said frame as they are received by the reception unit,
- at least one processing unit for carrying out a processing on at least one data item stored in said memory unit, the result of said processing being intended to be used in the management of the data retransmission.

In one embodiment, the analysis and filtering module also comprises a control unit to trigger the data loading from at least one of said reception unit and from the memory unit to said at least one processing unit, said loading and said processing being carried out during the reception of said frame as the data are stored in said memory.

The analysis and filtering module allows a maximum parallelisation of the arrival of a frame, the decoding thereof and the filtering thereof, which increases the performance (processing speed).

The analysis and filtering module allows a multi-protocol compatibility.

It can also allow an increase in the intrinsic safety of the data processing because the entirely hardware implementation thereof does not allow its behavior to be modified and its capacities to operate faster than the arrival of any data ensure its permanent availability.

According to embodiments, the operation of the module is synchronous.

For example, the control unit is a finite state machine.

For example again, the memory unit comprises a set of registers.

According to embodiments, the loading of data is triggered depending on the availability of said data in a given register.

According to embodiments, the module comprises a processing unit allowing the integrity check of said currently received frame.

For example, the integrity check relates to data loaded from said reception unit.

According to embodiments, the module comprises a processing unit which allows checking the validity of said currently received frame.

For example, the processing unit allowing checking the validity of said frame during reception operates a dichotomous processing of said frame.

According to embodiments, the processing unit allowing checking the validity of said currently received frame comprises a plurality of stages in series.

According to embodiments, at least one stage of the processing unit comprises a plurality of parallel sub-stages.

For example, the module comprises a processing unit (503) allowing carrying out specific calculations to supply at least one of a stage and a sub-stage of said processing unit allowing checking the validity of said currently received frame.

According to embodiments, the control unit further allows controlling the reception unit depending on information received from said at least one processing unit.

For example, the module is configured to generate an output indicating a reception anomaly of said frame depending on information received from said at least one processing unit.

For example again, the module is configured to generate an output indicating the content of said memory unit depending on information received from said at least one processing unit.

According to embodiments, the module is configured to generate an output pointer by at least one processing unit pointing to a memory space of the system containing a data structure for encapsulating said data frame to be retransmitted.

BRIEF DESCRIPTION OF THE FIGURES

Other features and advantages of the invention will appear on reading the present detailed description which follows, by way of non-limiting example, and the appended figures, among which:

FIG. 4 illustrates the processing of a frame according to embodiments;

DETAILED DESCRIPTION OF THE INVENTION

Figure 1:
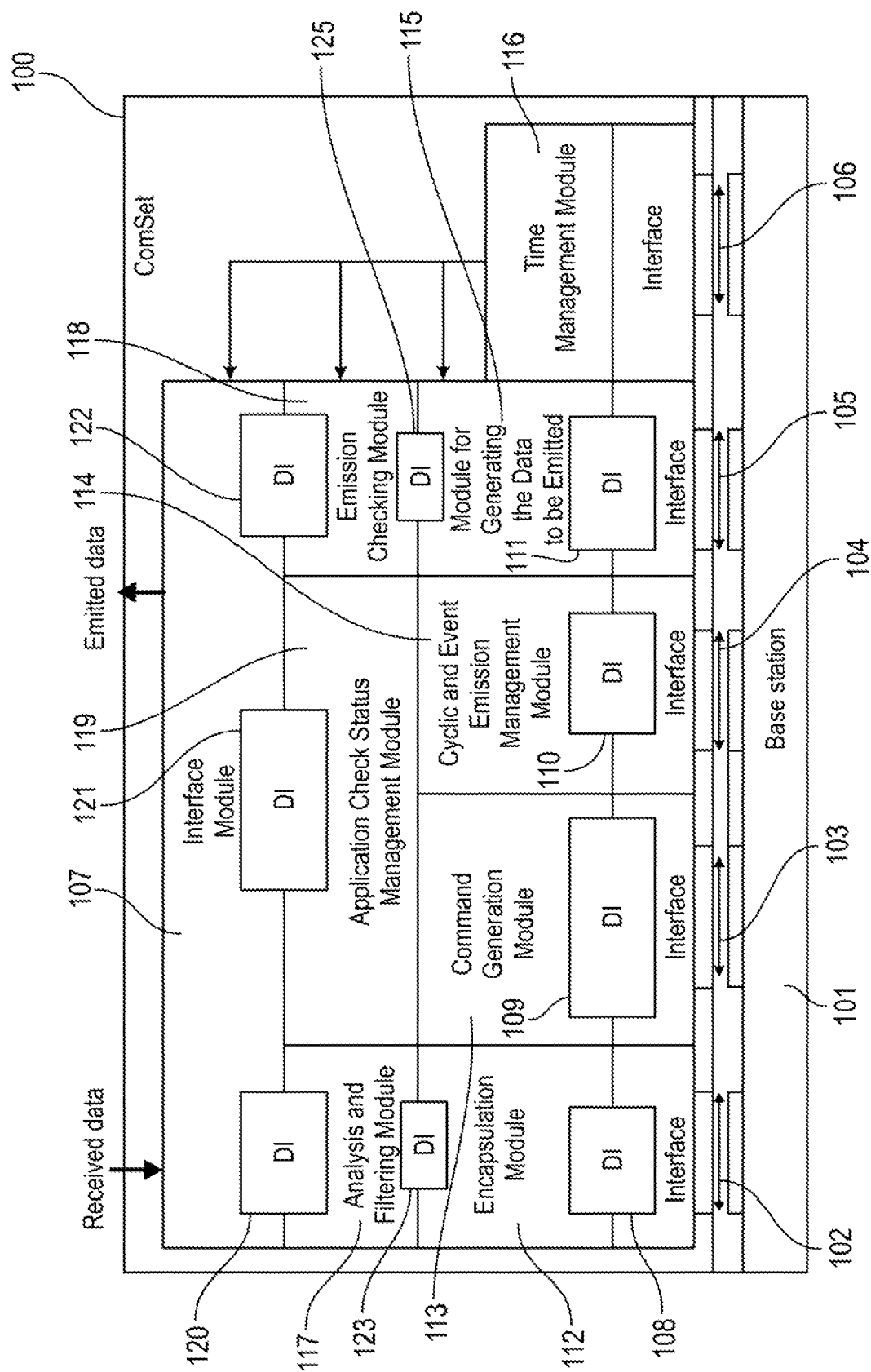
FIG. 1 illustrates a system according to embodiments.

A system according to embodiments is described with reference to FIG. 1.

The system which is represented in this figure is hardware implemented, that is to say that it is not software checked. The system is for example made in the form of a FPGA type circuit (acronym for "Field-Programmable Gate Array").

The system comprises one or more data exchange unit(s) 100 (ComSet) and a database unit 101 (Base station).

The database unit allows storing data exchanged between the data exchange units. The number of data exchange units is equal to the number of communication ports desired for the system. These communication ports are connected The exchange units 100 can be connected to a database unit 101 by means of a standardised interface, that is to say that the interface is the same for all modules. The standard interface comprises as many data transport buses as there are modules in direct communication with the database unit.

For example, a module 112 is in charge of encapsulating data frames which are received and to be processed within the system. This module communicates with the database unit via a dedicated bus 102. A module 113 is for example in charge of generating commands for the database unit 101 to extract data to be retransmitted. This module communicates with the database unit via a dedicated bus 103. A module 115 is in charge of receiving encapsulated frames from the database unit and of processing them for retransmission. This module communicates with the database unit via a dedicated bus 105. A module 114 is in charge of managing the emissions from the database unit indicating some events such as the storage of encapsulated frames. This management includes, for example, the coordination of modules 113 and 115. This module communicates with the database unit via a dedicated bus 104. A clock module 116 is in charge of receiving the general time updates of the system from the base station. Moreover, it provides the time to all modules of the data transmission system which must either mark the data or verify the transmission delays thereof. The clock module can also generate the events for supplying the synchronisation signals to the process which have requested them. It can further notify the data emission modules of the time of sending data when they are defined as cyclic by the parameterisation. The clock module communicates with the database unit via a dedicated bus 106.

The analysis and filtering module 117 is a module for processing the data frames which are received before their encapsulation by the module 112.

Conversely, the module 118 allows de-encapsulating an encapsulated frame which is received from the module 115.

A status management module 119 is in charge of storing the current operating states of each of the modules of the data transmission system. Preferably, the status management module 119 is in charge of storing the current operating states of each of the modules of the data transmission system if the parameterisation requires it. Indeed, the behavior of the data transmission system can be modified by the initial supply of configuration data in which it is possible to specify the states and incidents that it is desired to be able to manage. In addition, all modules are designed to transmit any operational incident to this status management module which then updates the information base thereof and generates an error event immediately if the parameterisation requires it to the data transmission system intended for this purpose.

The data exchanged by an exchange unit are received and sent through an interface module 107 configured depending on the protocol used outside the system. Examples of protocols with which the system can interfaced are Ethernet, CAN, ARINC 664P7 or others.

The communication between, on the one hand, the different modules 112, 113, 114, 115 of each exchange unit with, on the other hand, the respective communication buses 102, 103, 104, 105 takes place via interconnection devices 108, 109, 110, 111 which are described more precisely below.

The communication between, on the one hand, the different modules 117, 119, 118 of each exchange unit with, on the other hand, the interface module 107 also takes place via interconnection devices 120, 121, 122.

An interconnection device is also present between two successive modules along a data stream. The term "along a data stream" means the succession of the modules through which a data frame passes.

Thus, an interconnection device 123 connects the analysis and filtering module 117 in charge of processing the data frames received with the module 112 in charge of encapsulating the data frames which are received and to be processed within the data transmission system.

An interconnection device 125 connects the module 115 in charge of receiving encapsulated frames from the database unit 101 and of processing them for retransmission with the module 118 allowing de-encapsulating an encapsulated frame received from the module 115.

The interconnection devices comprise a temporary memory accessible independently in time by the module downstream of the interconnection device and by the module upstream of the interconnection device. According to one embodiment, the temporary memory of the interconnection device is a buffer memory. The memory is accessible independently in writing by the upstream module and in reading by the downstream module. This memory, which is accessible independently in time by the upstream and downstream modules, allows the upstream module to write in the memory independently of the reading by the downstream module. In other words, the upstream module and the downstream module use the memory of the interconnection device in a non-synchronised manner.

Thanks to the interconnection devices, the modules of the transmission system do not share storage space and exchange data via the memory of an interconnection device. Furthermore, the modules of the transmission system do not share a clock plan. The upstream and downstream modules are completely independent in the use of the memory of the interconnection device. There is no alteration in the determinism of the entire transmission system.

The interconnection devices allow minimum latency and have a bandwidth which is much higher than the maximum rate of each transmission and can therefore operate in "starvation" mode.

The interconnection devices may for example be memories called DPM (acronym for "Dual Port Memory") or DAM (acronym for "Dual Access memory") made in the form of an FPGA (acronym for "Field-Programmable Gate Array") type circuit.

The memory of the interconnection devices is accessible to the upstream module via a write interface and to the downstream module via a read interface. According to one embodiment, the read and write interfaces have an asynchronous clock relationship.

The write interface allows storing the data in the memory as they are received and the read interface allows reading said data of said frame in the order they are received.

The read interface is configured to read the data stored in the memory in the write order (thus the interconnection devices ensure a management called "FIFO" management of the data exchanged via them). Data stored in the memory can be read, re-read or even canceled by the read interface of the interconnection device.

According to one embodiment, the write interface is configured to carry out a processing on at least one data item stored in said memory in order to detect errors and interrupt the storage of the data of a data frame if an error is detected. The detected errors can for example be the absence of buffer space or a sequence error in the order of the data. E According to one embodiment, the read interface is configured to carry out a processing on at least one data item stored in said temporary memory in order to extract information on said at least one data item. The extracted information can be, for example, a sequence number, the production time thereof or even the length thereof. This information is transmitted to the downstream module at the same time as the data. They can be useful, for example, for processing in the data exchange units 100 or for storage in the database unit 101.

According to one embodiment, each interconnection device also comprises an error reporting interface reporting the write or read operating errors. This information is transmitted via the error reporting interface to a status reporting mechanism of the data transmission system.

When the interconnection devices are located along a stream of data frames (120, 123, 108, 111, 125, 118), the temporary memory of the interconnection devices store the data frames.

When the interconnection devices are not located along a stream of data frames (109, 110, 121), the temporary memory of the interconnection devices stores control and signaling data. These control and signaling data have the same format as the data frames.

Figure 2:
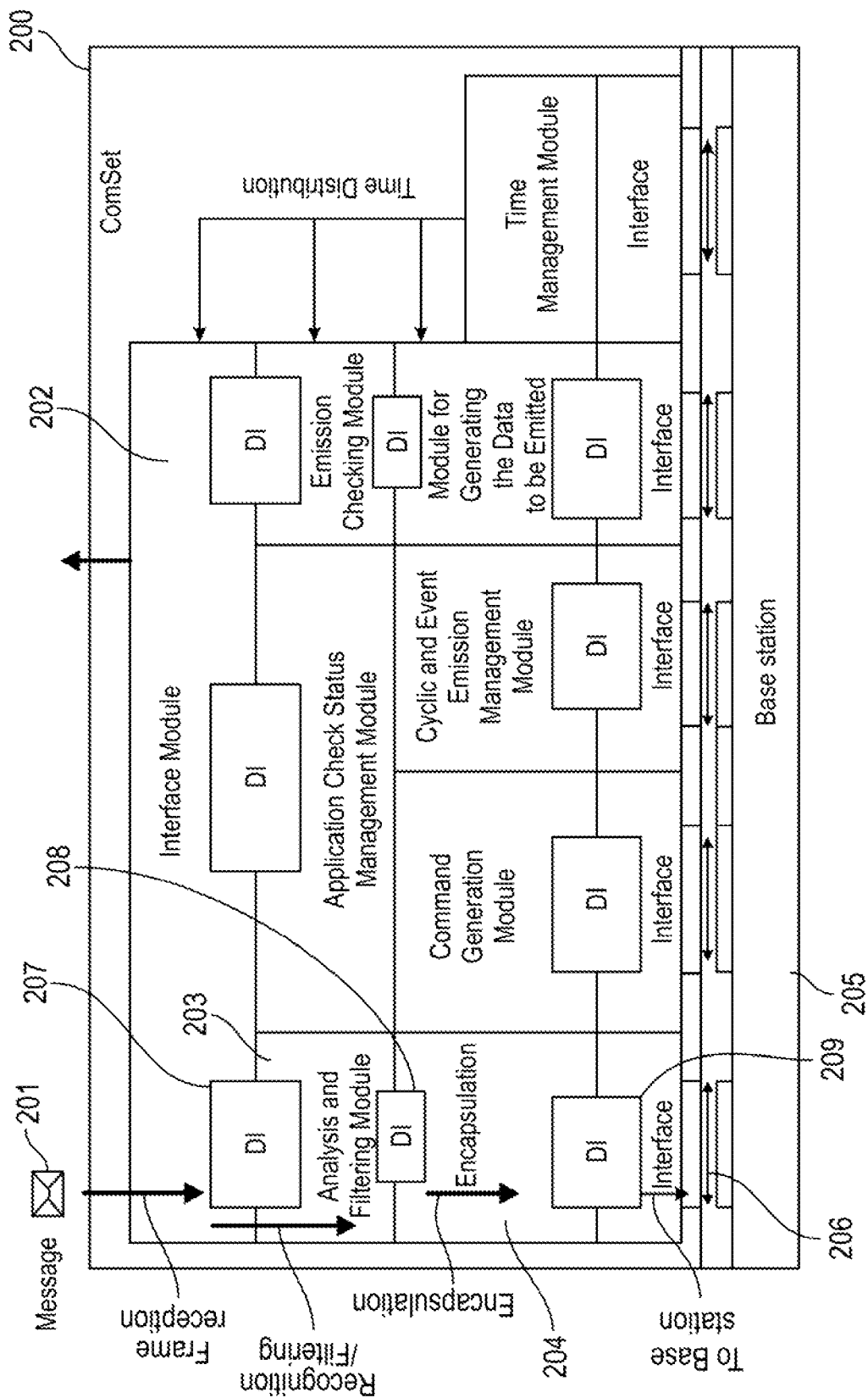
FIG. 2 illustrates the transmission of data according to embodiments.

With reference to FIG. 2, the transmission of a data item (or message) by an exchange unit 200 which has the same structure as previously described with reference to FIG. 1, is described.

The message 201 is received at the interface module 202. This interface module is in charge of the dialogue with the components responsible for the physical management of the signals of the protocol related to the data transmission system. It recovers the information from the frames received via these components and transmits them byte by byte to the next module via an interconnection device 207. The message 201 is transmitted from the interface module 202 to the module 203 in charge of the analysis and filtering of the message via the interconnection device 207.

The module 203 verifies the integrity of the message and also verifies that the message is authorised, by configuration, to be received by the exchange unit 200. In other words, the module 203 extracts the information from the incoming frame in order to ensure that the source IP address and the source port of the message as well as the size thereof are as defined by the parameterisation. On the other hand, the calculation of the CRC (acronym for "Cyclic redundancy check" or the checksum) allows verifying that the received frame is indeed intact.

The message is then transmitted from the module 203 in charge of analysis and filtering to the encapsulation module 204 via an interconnection device 208. The message is encapsulated in the encapsulation module 204. Once encapsulated, the message is processed independently of the protocol used to transport it outside the system. The encapsulated message is then transmitted to the database unit 205, via the interconnection device 209 and the bus 206, for memory storage.

The encapsulated message can be stored taking into account different parameters. This is for example to avoid the duplication of information in memory. The recording of a message is unique even if it has several recipients. Each recipient is notified of the arrival of the data as well as its location. The recipients are then authorised to pick it up for transmission. The arrival time of the data is also part of the encapsulation data so that the receivers of the information can check the temporal validity thereof. It is still a question, for example, of taking account of the aging of the message. It is still for example to manage the methods of access to the message which define the addresses of the objects in memory (one can for example mention the methods called "Sampling", "Queuing", "Flip/Flop" methods which are standard methods.

Figure 3A:
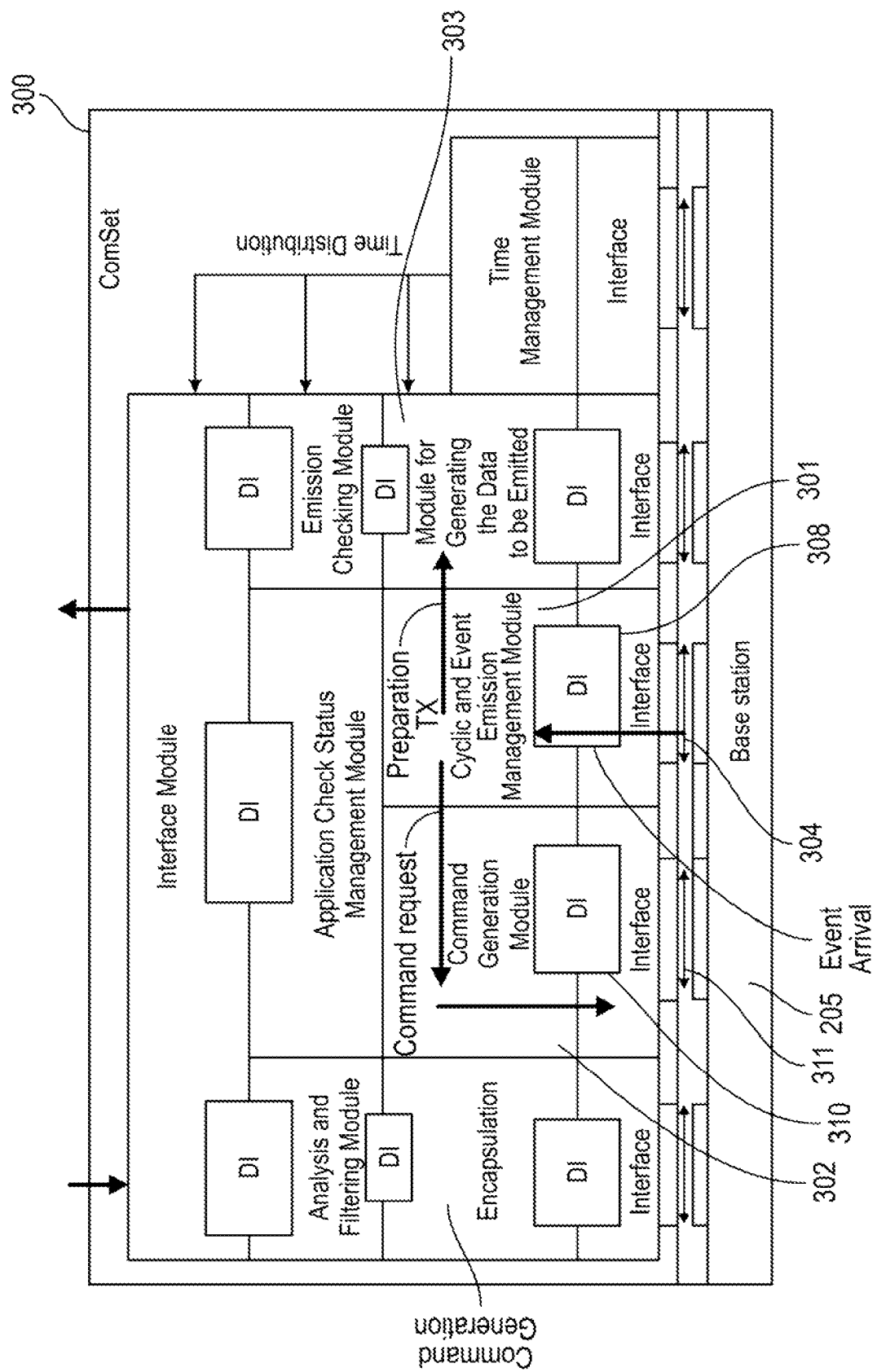
FIGS. 3a-3b illustrate the reception of data (or message) by a data exchange unit according to embodiments.
Figure 3B:
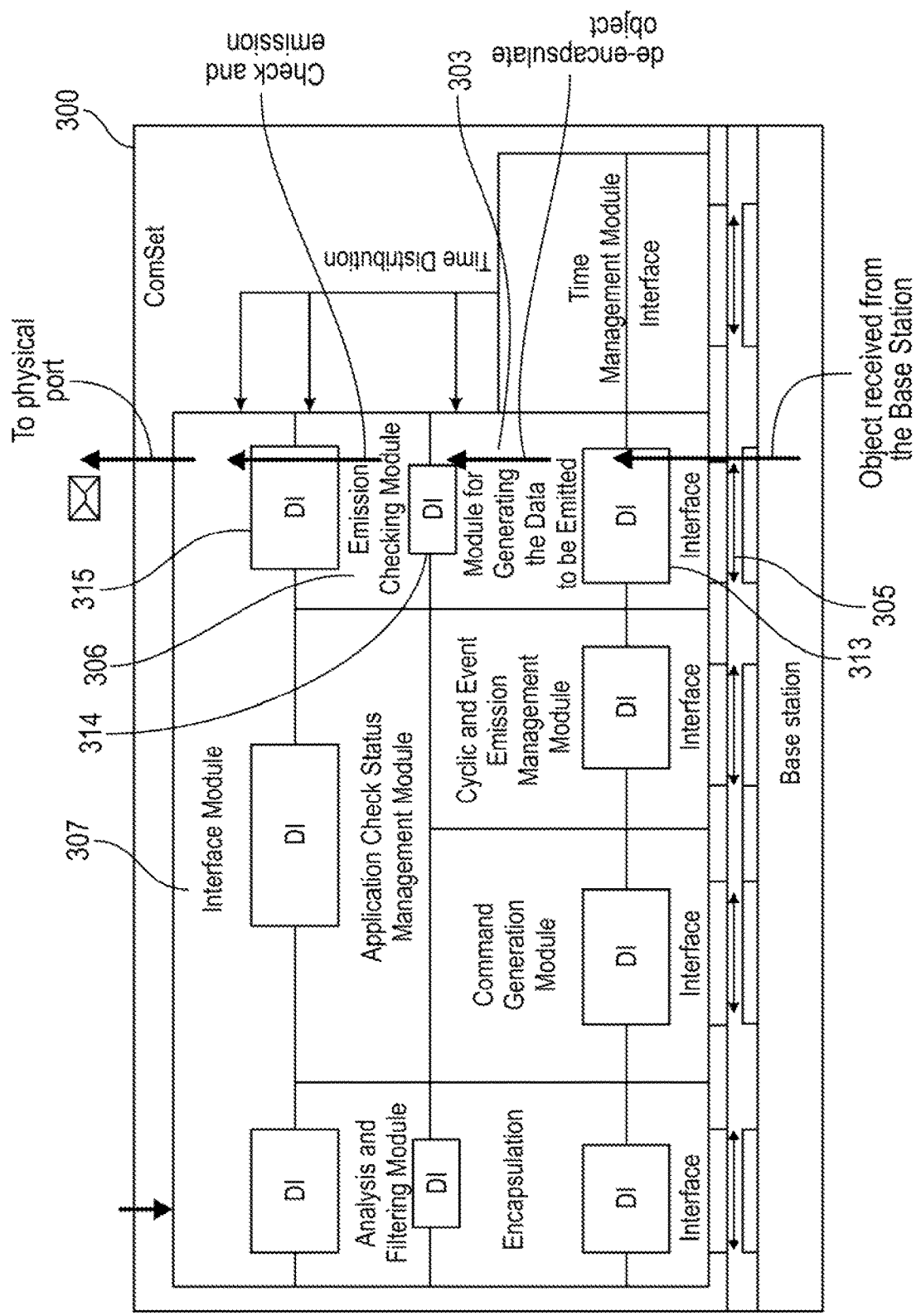

With reference to FIGS. 3a-3b, the reception of a data item (or message) by an exchange unit 300 is described.

Following the storage of the encapsulated message in the database unit 205 described above with reference to FIG. 2, "event" type data is sent to the exchange unit 300 to which the message 201 is intended via the bus 304 and the interconnection device 308. "Event" type data is an object in the common encapsulation format whose object is to warn the recipient module either of the behavior of another module or of an action to accomplish for the latter.

The database unit 205 (common to the modules 200 and 300) generates and manages the events relating to the emission of an encapsulated message. The database unit also rates the times of transmission of "event" type data to the exchange modules which must emit the encapsulated message concerned by the data. The emission module is notified by message that the data to be emitted is available and where to look therefor.

The "event" type data is then received by a module 301 for managing cyclic and event transmissions in charge of receiving these data. On receipt of such data, the module 301 sends a command request to the command generation module 302.

The command generation module 302 then sends a command to the database unit via an interconnection device 310 and the bus 311 so that the encapsulated object is sent to the exchange unit 300.

In parallel, the module 301 sends a request to put the encapsulated message into standby mode to the module 303 for generating data to be emitted.

The module 302 thus plays a role of managing the cycle (in particular the frequency) of sending messages.

The database unit then sends the encapsulated message via the bus 305 and an interconnection device 313 to the module 303 which de-encapsulates the message to make it a message conforming to the protocol of the equipment connected on the physical port of the exchange unit 300.

The message thus de-encapsulated is transmitted via an interconnection device 314 to the emission checking module 306 and then to the interface module 307 via an interconnection device 315. The checking module 306 after a last verification of the integrity of the data item using the check code (CRC) also verifies that the contained information corresponds to all the criteria defined by the parameterisation of the output port.

In the following, the operations which are carried out by the analysis and filtering module of a data exchange unit are described.

The filtering occurs between the reception of a frame and the encapsulation thereof. The purpose of the filtering is to verify that the received frame is indeed a known, expected and well-formed frame. If not, the frame is rejected and an error message is generated. The purpose of filtering is also to provide, if the frame is accepted, information of the locations where the data required for the encapsulation of the frame can be recovered.

In general, filtering, in the field of networks, is the operation which consists in verifying the integrity and validity of a reception frame.

The verification of the integrity of the frame allows ensuring that a received frame respects properties related to the structure thereof.

Among the performed verifications one finds, for example, the alterations at the elementary logic level (bit or set of bits). The verification is carried out thanks to error detector code of the cyclic redundancy check or CRC type.

One also finds among the performed verifications that the arrival of two successive frames should respect a minimum delay (one refers to IFG, acronym for "InterFrame Gap"). If this delay is not respected, the frame is considered corrupted.

Other verifications are possible such as for example the frame length intervals, denoted [LMAX, LMIN] which may depend on the protocols. A frame can have a fixed size (it is for example the case in the Arinc protocol 429) or a variable size bounded in lower and upper values (for example the Ethernet protocol 802.3). In addition to the normative restrictions, the user can tighten the conditions on the sizes. When the frame does not meet the size constraints, it is considered corrupted.

The validity verification allows ensuring that a frame received at a given reception point is indeed authorised to be received at that location (the term "location" implies "communication port" in network terminology). Authorisation decision making is based on the encapsulation data of the frame. If one takes the example of IP (acronym for "Internet Protocol") type frames, meeting the IEEE 802.3 standard, the encapsulation data are to be recovered from the fields of the protocol stack such as: "IPs source", "EtherType", "MAC source", "MAC destination", etc.

Each frame which passes through the filtering module causes a binary decision-making, therefore with two stable states and no possible indecision: the frame passes the filtering or the frame does not pass the filtering. Any violation of the integrity and/or validity of the frame causes it to be rejected (frame therefore does not pass the filtering).

Two actions are then triggered. A first action is the deletion (purge) of the frame of the filtering module. A second action is a lifting of an error status by checking the status management module mentioned above. The statuses can be managed in different manners. For example, it is possible to choose to send a state information cyclically and this, with a parameterisable periodicity, or to emit an event as soon as a particular event occurs to the module and the data transmission system which is parameterised for this purpose. The statuses can be active and therefore taken into account or hidden and therefore ignored.

In the case that no violation of the integrity and validity rules is detected, the frame is accepted into the system, in other words, the frame passes the filtering.

Two actions are then triggered. A first action is providing the frame to the next module (that is to say the encapsulation module). A second action is generating a pointer to the encapsulation tables which allows finding, in the internal memories, the data of some object encapsulation fields (over-encapsulation of the frame).

The encapsulation of a frame is in fact an over-encapsulation. A frame is already an encapsulation of the useful data by fields specific to the protocol. Herein, this consists of adding other fields. It is then possible to speak of over-encapsulation. Some fields are calculated and loaded into memory by a configurator in offline mode (before the start of the operational phase) and other fields are calculated by the component in online mode (during the operational phase).

A peculiarity of the filtering module, besides the fact that it is designed for an exclusively hardware implementation, is the guarantee of a very high performance compared to existing systems on the market. The "hardware implementation" aspect herein is opposed to a software implementation based on a Von Neumann type scheme. The filtering module, such as the data exchange unit to which it belongs, can be implanted in FPGA (acronym for "Field-Programmable Gate Array") or ASIC (acronym for "application-specific integrated circuit") type programmable circuits. The performance combines both high rate and temporal determinism.

The operation of the filtering module comprises a frame reception registry, dichotomy modules, and a check state machine.

The entire mechanism of the filtering module is cadenced by a check state machine which pushes the frame into a register structure as it is received, and, at appropriate times, loads particular data and/or make calculations on some of these data.

Even before the end of the reception of the frame, the filtering, which uses dichotomy tables for the search for information and actions to be performed, is already launched because all necessary information is made available.

As needed, it is possible to stop the operation, and to purge the module if, for example, a data corruption is detected via the protection mechanisms (such as the CRC (acronym for "Cyclic redundancy check") or the checksum).

In this operation, several processes are parallelised. Indeed, when the arrival of a frame is detected, it is de-serialised as it arrives. Each time a sufficient number of bits is correctly received, the state machine fills a reception register in the registry provided for this purpose. Each register is clearly identified. Thus, depending on the protocol of the currently received frame, it is possible to recover specific information on-the-fly for the needs, either for processing or for passing parameters for a given function.

An example frame is described with reference to FIG. 4. The invention is not limited to a particular protocol and can be applied to any protocol such as the Arinc 429 protocol or the Ethernet 802.3 protocol.

In the example of a frame conforming to the IEEE 802.3 standard, the first 6 received bytes are the MAC destination address, the next 6 bytes are the MAC source address, the next 2 bytes are the EtherType field. If, for filtering purposes, the module requires the last two bytes of the MAC destination address (number of the "Virtual Link" in the Arinc 664P7 standard), and if the registry consists of 32-bit registers (4 bytes) then the reception of the second register, denoted "Reg2" in FIG. 4, triggers a recovery of bytes 1 and 2 for the processing purposes (identification of the "Virtual Link").

The reception and storage operation, in addition to the tasks of recovering the parameters during reception, ensures the verification of the integrity of the frames: verification of the envelope of the frame, of the IFG, of the size, of the CRC, etc.

The information recovered from the encapsulation (sometimes after processing thereon) is used to ensure the validity of the frame. In other words, verify if the frame is authorised to pass into the rest of the system. This activity is supported by "dichotomy tables" also called "filtering tables".

For performance optimisation, the dichotomy scheme is divided into several stages, each stage of which can itself be subdivided into several portions. The principle of partitioning into «stages» and «portions» obeys the following two rules. The "stages" are "pipelined", that is to say, the outputs of a "stage" of order n−1 are inputs for the stage of order n. The execution of all "portions" in the same "stage" is parallelised.

In an exemplary implementation, the dichotomy is organised in two stages, the first of which is itself subdivided into two portions. Chronologically, the searches of the first stage are parallelised. The outputs of the first stage constitute inputs for the second stage which, at the output, provides a pointer to memory structures which allow the encapsulation module to over-encapsulate the received frame.

Figure 5:
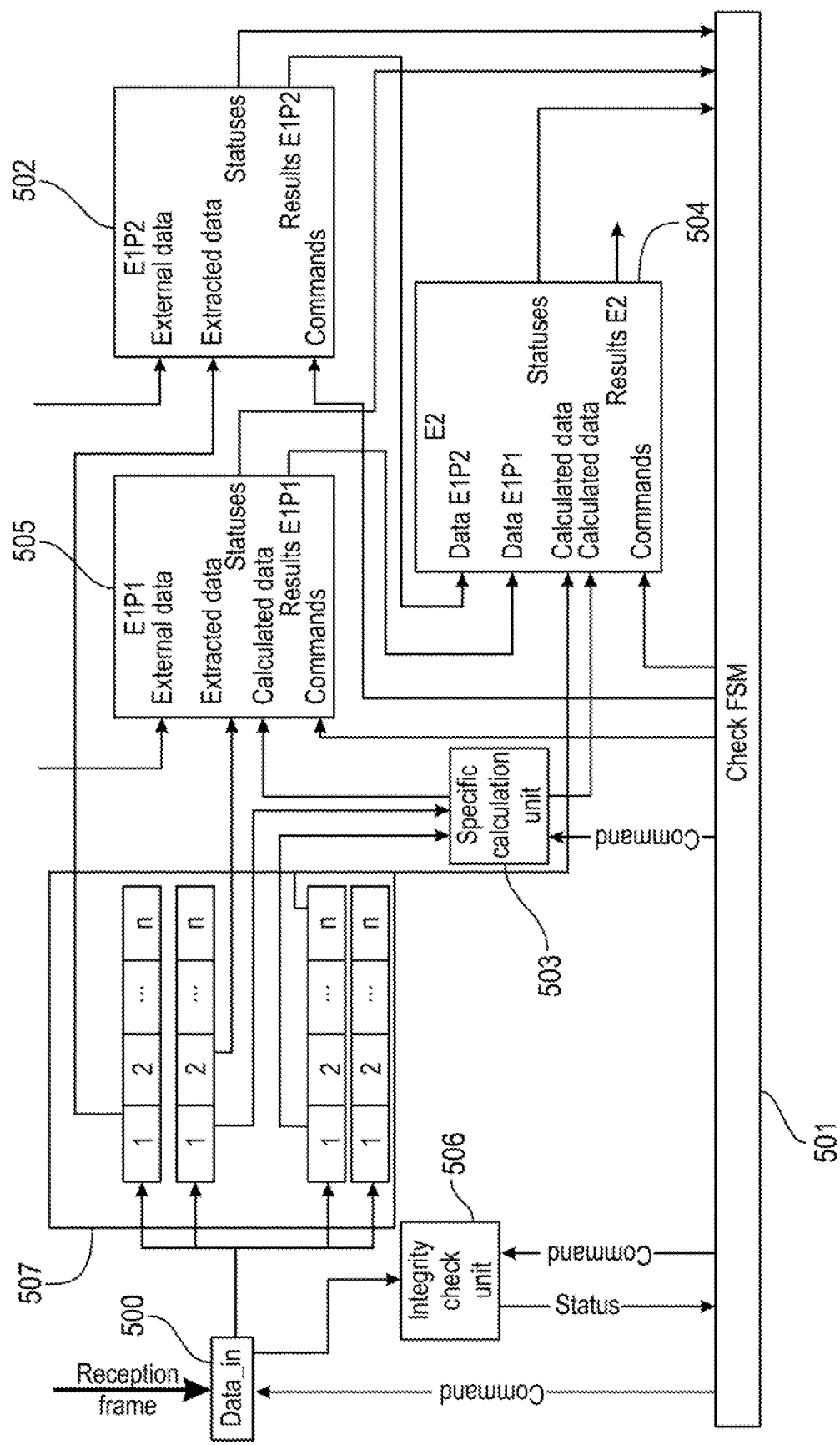
FIG. 5 is a diagram illustrating an analysis and filtering module according to embodiments.

FIG. 5 is a diagram illustrating a filtering module according to embodiments.

The overall operation of this module is synchronous. This module uses a single distributed clock. It is further managed by a finite state machine 501 (FSM acronym for "Final State Machine"). The interest of this way of doing is to be able of mastering the triggering and the duration of each operation, which induces a guarantee of a limited and known processing time, and therefore a guarantee of temporal determinism.

The reception frame is de-serialised in the input module 500 "Data_IN" which stores it as it arrives in a registry 507. As soon as relevant information becomes available in the latter, they are recovered for exploitation. In the example of FIG. 5, the first byte of the first register can be made available, upon receipt, to the module 502 for the dichotomous search of stage 1 portion 2, denoted E1P2. The Launching of the block 502 requires a control of the machine 501 as well as complementary data (denoted « external data » such as the frame envelope and the clock).

At the same time, the reception of the continuous frame and other information is taken on-the-fly either to supply the dichotomous searches or to supply a specific calculation unit 503 which subsequently supplies the dichotomous searches. The unit 503 allows processing some encapsulation information which cannot be used in the raw state thereof and/or must be combined so that it is subsequently exploitable. For example, the module 502 can only be launched after direct extraction of byte 2 from register 2 and provision of a processing result of the unit 503 based on the byte 1 of the register 2. The launch of the module 504 comprising the stage 2 of the dichotomy, denoted E2, can only be done once the processing of the stage 1 has been completed. Indeed, the results of the modules 502 (E1P1) and 505 (portion 1 of the stage 1 denoted E1P2) are injected as inputs into the module 504. In addition, these inputs are not exclusive. Each stage may need complementary inputs (in addition to that of the upstream stage). In the example of FIG. 5, the module 504 requires the last byte of the penultimate register as well as a result provided by the unit 503.

In parallel with all these treatments, an integrity checking unit 506 verifies that the reception frame does not comprise an anomaly. The verifications relate to several parameters such as for example the CRC, the length, the IFG, or other. This unit informs the machine 501 of the status of the reception in progress and overcomes an anomaly if necessary.

Throughout the operation, statuses are generated and exchanged in order to prevent any malfunction and detect any anomaly.

The outputs of the filtering module can be one or three according to the final state of the check state machine. An output is a status word containing the final state of the state machine with, if necessary, an indication (commonly called a flag) about the observed anomaly. If the processing took place correctly, then the filtering module also provides the content of the registry which is none other than the received frame and a pointer, coming from the last stage of the dichotomy, to the memory structures allowing creating the object resulting from the encapsule of the frame.

Figure 6:
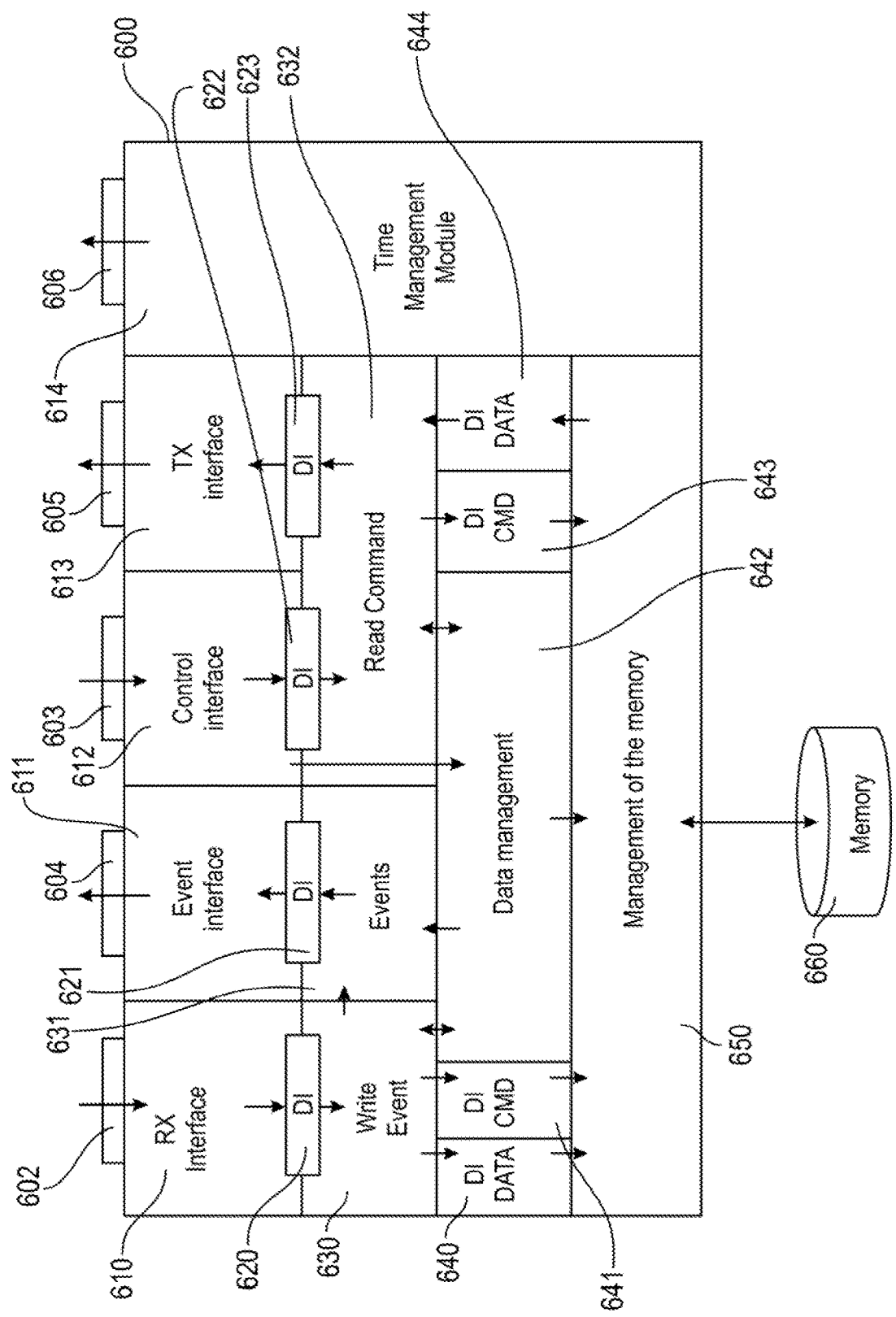
FIG. 6 is a diagram illustrating a database unit according to embodiments.

With reference to FIG. 6, the operation of a database unit 600 will now be described.

An encapsulated data frame is received via the bus 602 from the exchange unit as previously described with reference to FIG. 1 (in particular from an encapsulation module such as the module 112 of FIG. 1) by the RX interface module 610. This data frame is transmitted to a write event module 630 via an interconnection device 620. The write event module 630 is in charge of transmitting the received encapsulated data frames to a memory management module 650.

For this, depending on the information of the encapsulated data frame which are transmitted, in particular depending on the information located at the header of the frame, the write event module 630 communicates with a data management module 642 in order to obtain the write address in the memory 660 of the data frame. The data management module 642 is in charge of assigning a write address in the memory 660 to each data frame.

Once the write address of the data frame is received from the data management module 642, the write event module 630 communicates with the memory management module 650 by transmitting a write request via a first interconnection device 641 and transmitting the data frame via a second interconnection device 640.

As soon as the data frame is received, the memory management module 650 stores the data frame in the memory 660.

When the data frame has been stored, the write event module 630 communicates with an event module 631 and informs it of the storage of the data frame in the memory 660. Depending on the information of the stored encapsulated data frame, in particular depending on the information located at the header of the frame, the event module 631 communicates with the event interface module 611 via an interconnection device 621 which sends via the bus 604 a message to the exchange unit (in particular to the emission management module 114) concerning the available data with the references of the available data. The event module 631 is in charge of informing the exchange unit of the available stored data frames.

When the exchange unit wishes to recover a data frame, the command generation module 113 sends a read command via the bus 603 to the control interface 612. The control interface 612 transmits this command to the read control module 632 via an interconnection device 622. The read control module 632 is in charge of receiving the data frame commands from the exchange unit module and of sending the commanded data frames.

The read control module 632 which receives the command makes a request to the data management module 642 in order to obtain the address at which the data frame is recovered depending on the references provided in the command.

The data management module 642 then transmits the address to the read control module 632 which communicates its command to the memory management module 650 via a first interconnection device 643. The memory management module 650 recovers the data frame from the memory 660 from the communicated address and transmits the data frame to the read control module 632 via a second interconnection device 644.

Once the data frame has been recovered by the read control module 632, the latter transmits the data frame to the TX interface module 613 via an interconnection device 623. The TX interface module 613 finally transmits the data frame to the exchange unit (in particular to the module for generating the data to be emitted 115) via the bus 605.

The database unit also comprises a time management module 614 which communicates with the clock module 116 of the exchange unit via the bus 606 in order to transmit the updates of the general time of the system. The time management module 614 is also in charge of providing the synchronisation signals to the modules which have requested them.

The interconnection devices 620, 621, 622, 623, 640, 641, 643, 644 of the database unit have the same properties and capabilities as the interconnection devices which are described above with reference to the exchange unit.

The present invention has been described and illustrated in the present detailed description with reference to the attached figures. However, the present invention is not limited to the presented embodiments. Other variants, embodiments and combinations of features can be deduced and implemented by those skilled in the art on reading the present description and the appended figures.

In order to meet specific needs, a person competent in the field of the invention may apply modifications or adaptations.

In claims, the term "comprise" does not exclude other elements or steps. The indefinite article "one" does not exclude the plural. A single processor or several other units can be used to implement the invention. The different features which are presented and/or claimed can be advantageously combined. Their presence in the description or in different dependent claims does not in fact exclude the possibility of combining them. The reference signs should not be understood as limiting the scope of the invention.

The invention claimed is:

1. Data transmission system comprising a data exchange unit wherein, in order to transmit a data frame, said data frame passes successively at least through:
    an interface module configured to receive said data frame from the outside of the transmission system;
    an analysis and filtering module in charge of processing said data frame received from the interface module before encapsulation; and
    an encapsulation module (in charge of encapsulating said data frame processed by the analysis and filtering module so that the message, once encapsulated, is processed independently of the protocol used to transport it outside the data transmission system;
    wherein two successive modules through which said data frame passes are connected to each other by an interconnection device each comprising a temporary memory for storing said frame and the write and read accesses to said memory being independent in frequency; and
    wherein the two successive modules through which said data frame passes are connected without any other device than the interconnection device.

2. Data transmission system according to claim 1, further comprising a database unit, wherein the database unit is configured to store the data frames which are encapsulated by the encapsulation module and wherein the database unit is connected to the encapsulation module by an interconnection device comprising a temporary memory for storing said frame and the write and read accesses to said memory being independent in frequency.

3. Data transmission system according to claim 2, wherein in order to transmit a data frame, the latter further passes successively at least through:
    a module for generating the data to be emitted in charge of receiving encapsulated data frames from the database unit and of processing them with a view to a retransmission; and
    an emission checking module in charge of de-encapsulating an encapsulated data frame which is received from the module for generating the data to be emitted then transmitting the de-encapsulated data frame to the interface module with a view to emitting the de-encapsulated data frame out of the transmission system.

4. Data transmission system according to claim 3, wherein the database unit is connected to the module for generating the data to be emitted by an interconnection device comprising a temporary memory for storing said frame and the write and read accesses to said memory being independent in frequency.

5. Data transmission system according to claim 2, wherein the data exchange unit also comprises:
    a management module in charge of managing the emissions of encapsulated data frames from the database unit; and
    a command generation module in charge of generating commands for the database unit to control the extraction of a data item to be retransmitted and communicate it to the module for generating the data to be emitted.

6. Data transmission system according to claim 5, wherein the database unit is connected to the management module by an interconnection device comprising a temporary memory for storing control and signaling data and the write and read accesses to said memory being independent in frequency.

7. Data transmission system according to claim 5, wherein the database unit is connected to the command generation module by an interconnection device comprising a temporary memory for storing control and signaling data and the write and read accesses to said memory being independent in frequency.

8. Data transmission system according to claim 1, wherein the data exchange unit further comprises a status management module, in charge of storing the current operating states of each of the modules of the data transmission system, connected to the interface module by an interconnection device comprising a temporary memory for storing control and signaling data and the write and read accesses to said memory being independent in frequency.

9. Data transmission system according to claim 1, wherein two successive modules through which said data frame passes operate according to independent clocks.

10. Data transmission system according to claim 1, wherein the memory of each interconnection device is parametrisable at initialisation.

11. Data transmission system according to claim 1, wherein each interconnection device comprises a write interface to store data in the temporary memory as they are received and a read interface to read said data in the order they are received.

12. Data transmission system according to claim 11, wherein each interconnection device, in which a data frame passes, is configured to store the data frames as they are received and to read said data frames in the order they are received.

13. Data transmission system according to claim 11, wherein the read and write interfaces have an asynchronous clock relationship.

14. Data transmission system according to claim 11, wherein the write interface is configured to carry out a processing on at least one data item stored in said temporary memory to detect errors and interrupt the data storage if an error is detected.

15. Data transmission system according to claim 11, wherein the read interface is configured to read the entire data, to re-read the data or to delete the data.

16. Data transmission system according to claim 11, wherein the read interface is configured to carry out a processing on at least one data item stored in said temporary memory in order to extract information on said at least one data item.

17. Data transmission system according to claim 1, wherein each interconnection device comprises an error reporting interface for transmitting the write or read operating errors.

18. Data transmission system according to claim 1, wherein the analysis and filtering module comprises:

a unit for receiving a data frame to be retransmitted, a memory unit for storing said data of said frame as they are received by the reception unit, at least one processing unit for carrying out a processing on at least one data item stored in said memory unit, the result of said processing being intended to be used in the management of the data retransmission.

19. Data transmission system according to claim 18, wherein the analysis and filtering module also comprises a control unit to trigger the data loading from at least one of said reception unit and from the memory unit to said at least one processing unit, said loading and said processing being carried out during the reception of said frame as data are stored in said memory.

20. Data transmission system according to claim 1, wherein each module is made in an application-specific programmable circuit or integrated circuit or wherein each interconnection device is made in an application-specific programmable circuit or integrated circuit.

* * * * *